Sept. 5, 1950    V. H. HASSELQUIST    2,521,163
BELT-DRIVEN PULLEY CLUTCH AND BRAKE
Filed Jan. 9, 1947

Inventor
Victor H. Hasselquist
By
Atty

Patented Sept. 5, 1950

2,521,163

UNITED STATES PATENT OFFICE 2,521,163

BELT-DRIVEN PULLEY CLUTCH AND BRAKE

Victor H. Hasselquist, Akron, Ohio, assignor to The B. F. Goodrich Company, New York, N. Y., a corporation of New York Application January 9, 1947, Serial No. 721,123

18 Claims. (Cl. 192—4)

This invention relates to belt drives and especially to V-belt drives in which it is desirable to start and stop the driven member intermittently without stopping the driving member. In the operation of certain machines and machine tools, it is necessary to stop the motion of the mechanisms frequently, but it is desirable that the line shafts or motors continue to rotate as for instance when other mechanisms are driven by the same driving members.

Objects of the invention are to provide an improved belt drive, to provide for coupling and uncoupling the driving and driven members, to provide for braking of the driven member, to provide for continued rotation of the driving member when it is not coupled to the driven member, to provide these results especially in a V-belt transmission, and to provide for simplicity in construction and efficiency of operation.

A further object is to provide through manipulation of a manually controlled member for coupling the driving and driven members when the brake is released and uncoupling the members when the brake is applied.

These and other objects will be apparent from the following description, reference being had to accompanying drawings in which.

Figure 1:
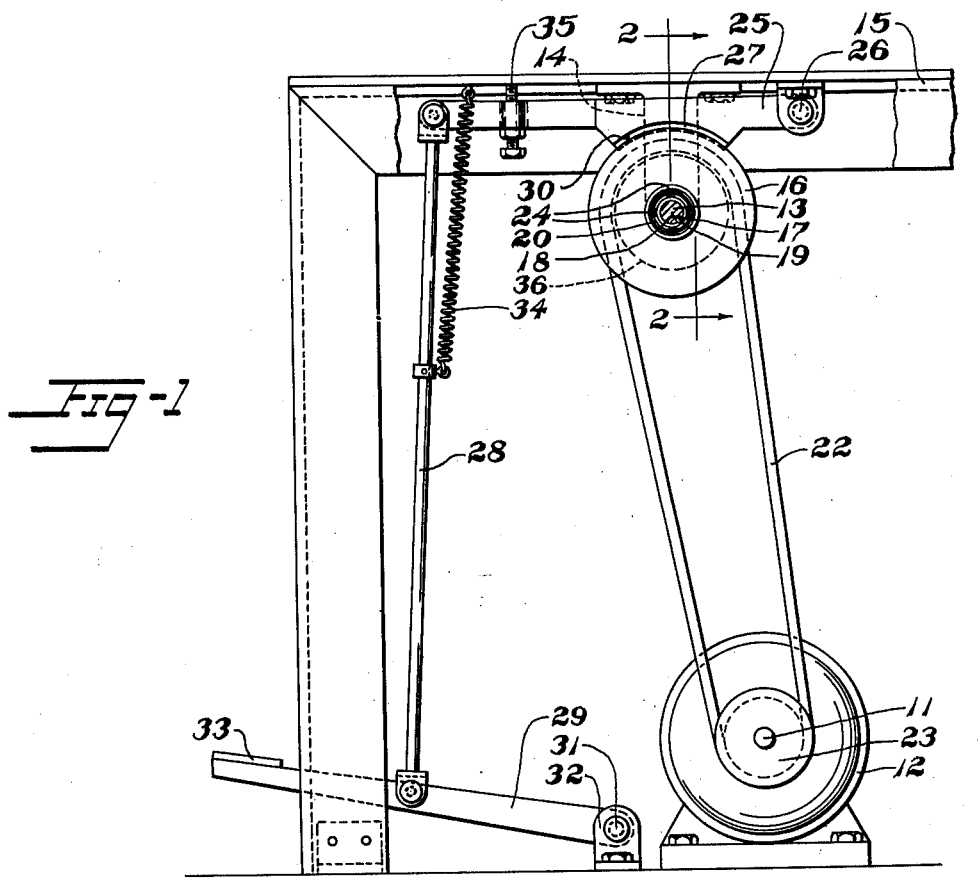
Fig. 1 is an elevation of apparatus embodying the invention, parts being broken away.

The drive of the illustrated embodiment of the invention comprises a driving member such as a shaft 11 mounted in a motor 12. A power-transmitting driven member such as shaft 13 is mounted rotatably in a hanger 14, which is mounted on a frame structure 15. A pair of radially extending elements such as flanges 16, 16, are mounted on the driven shaft 13 slidably in an axial direction and are prevented from turning relative to the shaft by a key 17 inserted in keyways 18 and 19 in the shaft 13 and flanges 16, 16 respectively. The flanges 16, 16 have opposed conical faces 21, 21 engageable with a V-belt 22. The V-belt 22 is disposed between the flanges and about the driven shaft 13 and about a driving pulley 23 which is mounted fixedly on the driving shaft 11.

An arm member 25 is pivoted on a pin 26 which is secured to the frame structure 15. The arm member 25 has a wedge-shaped portion 27 with shoulders 30, 30 which may be arcuate as shown for example in Fig. 1. This arm member 25 is disposed in such a position that downward movement of the arm member about the pin 26 will move the wedge-shaped portion 27 between the flanges 16, 16 and urge them apart.

Tension springs 24, 24 are disposed between the flanges 16, 16 in axially extending passages therein and may be prevented from leaving the passages by retaining rings 20, 20 which are inserted through eyes at the end portions of the springs and bear against the end surfaces of the flanges 16, 16.

The arm member 25 is connected by a rod 28 to an arm member 29, which is pivoted on a pin 31 secured in brackets 32, which may be fixed to the floor or to the frame structure 15. A pedal 33 is mounted on the arm member 29 for depressing the arm member 29 and a tension spring 34 is secured to the rod 28 and the frame structure 15 for raising the arm member. A set screw 35 is threaded in the arm 25 and may be used to regulate the height of the pedal relative to the frame structure 15.

Figure 2:
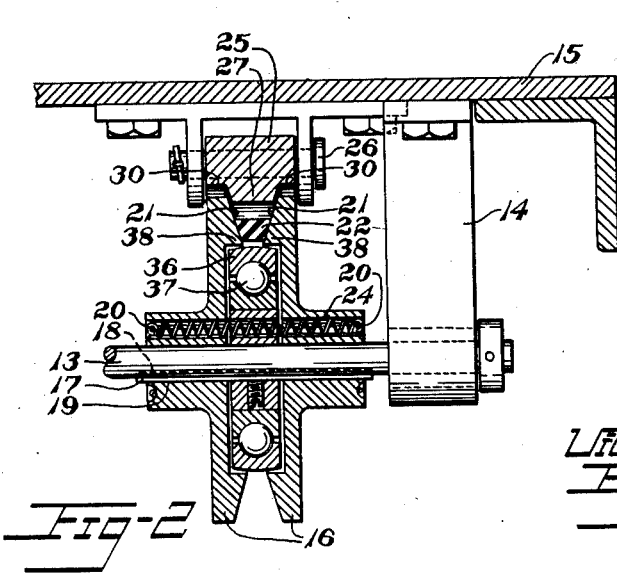
Fig. 2 is a section taken along line 2—2 of Fig. 1.

Between the flanges 16, 16, which are mounted on the driven shaft 13 is mounted a driven idler member such as a flat pulley 36, which may be crowned if desired. This pulley 36 is mounted on the driven shaft 13, and may be rotatable relative to the shaft on anti-friction bearings such as ball bearings 37, which are interposed between the shaft and the pulley. As shown in Fig. 2 the outside diameter of the flanges 16, 16 is greater than the outside diameter of the idler pulley 36 and the conical faces 21, 21 of the flanges extend from the idler pulley face to the outer edges of the flanges 16, 16. The flanges 16, 16 are recessed at the portions adjacent the idler pulley 36 and have shoulders 38, 38 overhanging the idler pulley in slightly spaced relation thereto to accommodate the outer edges of the idler pulley 36 without rubbing.

In operation, with the apparatus as shown in Figs. 1 and 2, the V-belt 22 is in driving engagement with the driving pulley 23 and with the flanges 16, 16. The conical faces 21, 21 of the flanges 16, 16 are urged against the V-belt 22 by the springs 24 and urge the V-belt axially outward, maintaining tension upon the belt.

Figure 3:
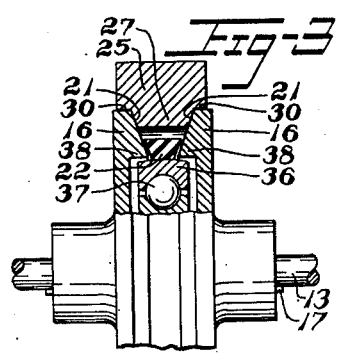
Fig. 3 is a view like Fig. 2 showing the belt in the idling position.

When the pedal 33 is depressed from the position shown in Fig. 1, the rod 28 will move the arm member 25 towards the pulley 36, 36 and the wedge-shaped portion 27 of the arm member 25 will move in the space between the flanges 16, 16 and urge the flanges apart. The friction between this wedge-shaped portion of the arm 25 and the flanges 16, 16 will provide braking of the flanges and the driven shaft 13. Depth of movement is limited by the shoulders 30, 30 which when pressed into engagement with the rim faces of the flanges 16, 16 will provide additional braking action. This parting of the flanges will move them away from the belt 22 as shown in Fig. 3, and the belt may then engage the idler pulley 36, which will rotate without being affected by the rotation of the flanges or of the driven shaft 13. Thus, by depressing the pedal 33 the driven shaft 13 may be stopped while the belt 22 and driving shaft 11 continue to move.

When it is desired to resume rotation of the driven shaft 13, the pedal 33 may be released and the spring 34 will return the arm member 35 to the position shown in Fig. 1, which is determined by the engagement of a set screw 35 with the frame structure 15. Raising the arm member 25 will move the wedge-shaped portion 27 of the arm 25 away from the flanges 16, 16 and allow the resilient springs 24 to move one flange 16 toward the other. The converging movement of the flanges 16, 16 upon the belt 22 increases the friction between the belt sides and the sides of the pulley. Also the conical faces 21, 21 tend to urge the belt away from the idler pulley 36 and increase the tension of the belts as they converge. This increased tension and friction between the belt and flanges provides engagement between the belt and flanges 16, 16 to rotate the flanges and the driven shaft 13.

It will be seen from the foregoing that the assembly is compact and conveniently assembled and that it provides a cushioned clutching action under ready manual control of the operator. The advantages of V-belt transmission are utilized and in addition, effective braking action is provided. The clutching and braking actions may be coordinated through simple manipulation of the pedal 33.

Variations may be made without departing from the scope of the invention as it is defined in the following claims.

I claim:

1. A transmission mechanism comprising a rotatable driving member, a belt member, a pulley member, a driven member comprising radially-extending elements coaxial with and disposed at opposite sides of said pulley member, said belt member being engageable with said pulley member, said radially-extending elements being individually moveable along the axis thereof, means comprising an element mounted substantially nonmoveably in the direction of the axis and moveably in the radial direction of the axis into engagement with the opposing faces of said radially-extending elements for shifting said radially-extending elements out of engagement with said belt member and means for shifting said radially-extending elements into engagement with said belt member.

2. A transmission mechanism comprising a rotatable driving member, a belt member, a pulley member, a driven member comprising coaxial flanges disposed at opposite sides of said pulley member, said flanges having opposed conical faces for engagement with said belt and being individually moveable along the axis thereof, means comprising an element mounted substantially nonmoveably in the direction of the axis and moveably in the direction of the axis into engagement with the opposing faces of said flanges for shifting said flanges out of engagement with said belt member and for moving said belt member radially inward with respect to said pulley and means for shifting said flanges into engagement with said belt members.

3. A transmission mechanism comprising a rotatable driving member, a belt member, a driven idler pulley member, a driven power-transmitting member comprising a pair of flanges disposed at opposite sides of said pulley and mounted for rotation relative to said pulley and for individual movement along the axis thereof, said belt member being engageable with said driving member and the flanges of said driven power-transmitting member, and resilient means for urging said flanges together and means comprising an element mounted moveably in the radial direction of the axis into and out of engagement with said flanges for urging said flanges apart.

4. A transmission mechanism comprising a rotatable driving member, a belt member, a driven idler pulley member, a driven power-transmitting member comprising a pair of flanges disposed at opposite sides of said pulley and mounted for rotation relative to said pulley and for movement axially relative to said pulley, said belt member being engageable with said driving member and said driven members, resilient means for urging said flanges together, and means for urging said flanges apart comprising a non-rotatable, wedge-shaped member movable radially between said flanges and having tapered sides in spreading engagement with said flanges.

5. A transmission mechanism comprising a rotatable driving member, a belt member, a driven idler pulley member, a driven power-transmitting member comprising a pair of flanges disposed at opposite sides of said pulley, said flanges being movable axially relative to each other, and having opposed conical faces for engagement with said belt member, said belt member being engageable with said driving member and said driven members, resilient means for urging said flanges together, and means for urging said flanges apart and for simultaneously resisting rotation of said flanges comprising a member movable radially between said flanges.

6. A transmission mechanism comprising a rotatable driving member, a belt member, an idler pulley member, a driven power-transmitting member comprising a pair of flanges at opposite sides and coaxial with said idler pulley member, said flanges being movable individually along the axis thereof, said belt member being engageable with said idler pulley member at the innermost peripheral surface of the belt member and being engageable with said flanges at the sides of said belt member, means comprising an element mounted moveably in the radial direction of the axis into and out of engagement with the belt-engaging faces of said flanges for moving said flanges apart and means for moving said flanges toward each other.

7. A belt-driven transmission comprising a shaft, a pair of flanges mounted slidably in an axial direction on said shaft, an idler pulley member mounted rotatably on said shaft and between said flanges, resilient means for urging said flanges together and means for simultaneously urging said flanges apart and resisting rotation thereof.

8. A transmission mechanism comprising a rotatable driving member, a belt member, a pulley member, a driven member comprising coaxial flanges disposed at opposite sides of said pulley member, said flanges having opposed conical faces for engagement with said belt and being shiftable axially relative to said pulley member, said flanges and said pulley member having passages extending axially therethrough, resilient means disposed in said passages for urging said flanges toward each other, and means for urging said flanges apart, including a non-rotatable, wedge-shaped member movable radially between said flanges and having tapered sides in spreading engagement with said flanges.

9. A transmission mechanism comprising a rotatable driving member, a belt member, a pulley member, a driven member comprising coaxial flanges disposed at opposite sides of said pulley member, said flanges having opposed conical faces for engagement with said belt and being individually moveable along the axis thereof, said flanges and said pulley member having passages extending axially therethrough, springs disposed in said passages for urging said flanges together, retaining rings secured to the end portions of said springs and disposed at the outer ends of said flanges, and means comprising an element mounted substantially nonmoveably in the direction of the axis and moveably in the radial direction of the axis into and out of engagement with the conical faces of said flanges for urging said flanges apart.

10. A transmission mechanism comprising a rotatable driving member, a belt member, a pulley member, a driven member comprising coaxial flanges disposed at opposite sides of said pulley member, said flanges having opposed conical faces for engagement with said belt and being recessed to accommodate end portions of said pulley member for free relative movement, said flanges being individually moveable along the axis thereof, said pulley member having a passage extending therethrough, resilient means for urging said flanges together including a coil spring, means securing said spring to said flanges, and means comprising an element mounted substantially nonmoveably in the direction of the axis and moveably in the radial direction of the axis into and out of engagement with the conical faces of said flanges for urging said flanges apart.

11. A transmission mechanism comprising a rotatable driving member, a belt member, a driven member comprising a pair of coaxial flanges having opposed conical faces and mounted for movement axially relative to each other, said belt member being engageable with said driving member and with said driven member, means for urging said flanges together and means engageable with said opposed conical faces for urging said flanges apart and for simultaneously resisting rotation of said flanges.

12. A transmission mechanism comprising a rotatable driving member, a belt member, a driven power-transmitting member comprising a pair of coaxial flanges having opposed faces, at least one of said flanges being movable axially relative to the other, said belt member being engageable with said driving member and with said driven members, means for urging said flanges together and means engageable with said opposed faces of said flanges for urging said flanges apart and for simultaneously resisting rotation of said flanges.

13. A transmission mechanism comprising a rotatable driving member, a belt member, a driven member comprising a pair of coaxial flanges having opposed faces and mounted for movement axially relative to each other, said belt member being engageable with said opposed faces of said flanges, means for urging said flanges together, and means for urging said flanges apart and for simultaneously resisting rotation of said flanges comprising a member movable against said flanges and having tapered sides in spreading engagement with said flanges.

14. A transmission mechanism comprising a rotatable driving member, a belt member, a driven member comprising a pair of coaxial flanges having opposing conical faces and mounted for movement axially relative to each other said belt member being engageable with said driving member and said driven member, means for urging said flanges together, means for urging said flanges apart and for simultaneously resisting rotation of said flanges comprising a member movable radially against said opposing conical faces of said flanges.

15. A belt-driven transmission comprising an idler pulley member, a pair of flanges coaxial with said pulley member and disposed at the sides of said pulley member, each of said flanges being individually moveable along the axis thereof, means for urging said flanges together and into driving engagement with the belt and flange spreading means comprising a radially moveable element engageable with opposing faces of said flanges for urging said flanges apart and out of driving engagement with the belt.

16. A belt-driven transmission comprising an idler pulley member, a pair of flanges coaxial with said pulley member and disposed at the sides of said pulley member, said flanges being individually moveable along the axis thereof, means for urging said flanges together and means comprising an element mounted substantially nonmoveably in the direction of the axis and moveably in the radial direction of the axis into and out of engagement with said flanges for urging said flanges apart.

17. A belt-driven transmission comprising a shaft, a pair of flanges mounted slidably in an axial direction on said shaft, an idler pulley member mounted rotatably on said shaft and between said flanges, means for urging said flanges together and means comprising an element mounted moveably in the radial direction of the axis into and out of engagement with said flanges for simultaneously urging said flanges apart and resisting rotation thereof.

18. A belt-driven transmission comprising a shaft, a pair of flanges mounted slideably for independent movement in an axial direction on said shaft, an idler pulley member mounted rotatably on said shaft and between said flanges, means for urging said flanges together and flange spreading means comprising a non-rotatable, wedge-shaped element mounted substantially nonmoveably in the direction of the axis and moveably in the radial direction of the axis into and out of engagement with said flanges for urging said flanges apart.

VICTOR H. HASSELQUIST.

REFERENCES CITED

The following references are of record in the file of this patent:

UNITED STATES PATENTS

| Number | Name | Date |
|---|---|---|
| 1,012,912 | Prather | Dec. 26, 1911 |
| 1,274,891 | Jones | Aug. 6, 1918 |
| 2,008,992 | Oak | July 23, 1935 |
| 2,254,592 | Berkeley | Sept. 2, 1941 |
| 2,256,312 | Cregier | Sept. 16, 1941 |
| 2,259,149 | Cederstrom | Oct. 14, 1941 |
| 2,369,681 | Miles | Feb. 20, 1945 |

FOREIGN PATENTS

| Number | Country | Date |
|---|---|---|
| 202,332 | Great Britain | Aug. 13, 1923 |
| 557,884 | France | Aug. 17, 1923 |